J. Miller,

Wash Board.

No. 101,643.  Patented Apr. 5, 1870.

Witnesses

Inventor
John Miller,
Per
T. H. Alexander.
Atty

United States Patent Office.

JOHN MILLER, OF YOUNGSTOWN, OHIO.

Letters Patent No. 101,643, dated April 5, 1870.

IMPROVED WASHING-MACHINE

The Schedule referred to in these Letters Patent and making part of the same.

*To all whom it may concern:*

Be it known that I, JOHN MILLER, of Youngstown, in the county of Mahoning and State of Ohio, have invented certain new and useful Improvements in Wash-Boards; and I do hereby declare that the following is a full, clear, and exact description thereof, reference being had to the accompanying drawings and to the letters of reference marked thereon, which form a part of this specification.

The nature of my invention consists in the construction of a wash-board, and in combining with a wash-board a rubber of suitable construction, said rubber being attached to the wash-board by means of rubber straps.

In order to enable others skilled in the art to which my invention appertains to make and use the same, I will now proceed to describe its construction and operation, referring to the annexed drawings, in which—

Figure 1:
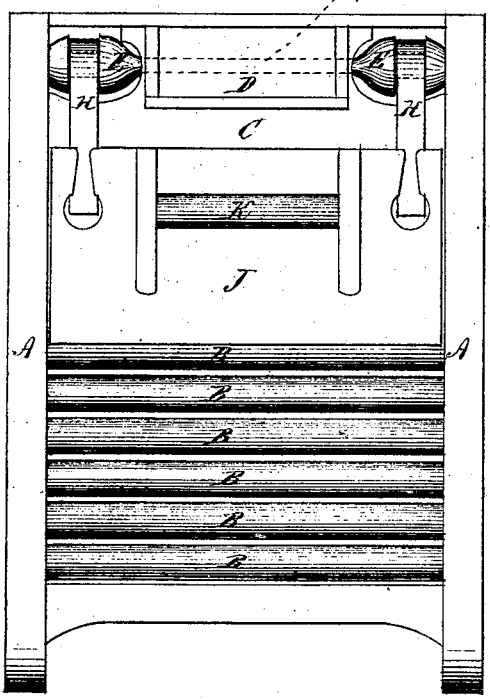

Figure 1 is a plan view, and

Figure 2:
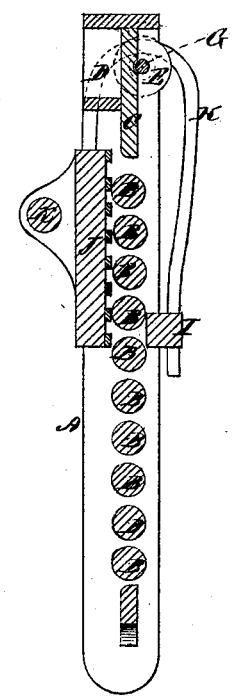

Figure 2, a longitudinal vertical section of my improved wash-board, with the rubber attached thereto.

A represents the frame of my wash-board. In this frame is placed a series of rollers, B B, which form the washing-surface, in place of the usual corrugated surface found in almost all wash-boards.

The arrangement of these rollers as a washing-surface prevents the tearing of the clothes, makes the motion easier, and also gives the water a chance to pass through at all places without running down the wash-board.

Above the roller B B is the usual board or head C, provided with the soap-box D.

In a recess on the under side of the board C is placed a shaft, G, which has its bearings in the sides of the frame A.

This shaft is, near each end, provided with a pulley, E, which project through openings made for that purpose in the board or head C.

Over the pulleys E E are placed rubber straps H H, the rear or under ends of which are attached to a cross-bar, I, on the under side of the wash-board, and their upper or front ends are attached to a rubber, J.

The rubber J is made of wood of suitable size to fit within the frame A on the rollers B B. It is grooved or corrugated on its inner or under side, and provided with a handle, K, on its outer side.

The clothes are laid on the rollers B B, and the rubber J is placed on the clothes. They are then washed by pressing the rubber down on them and moving it up and down.

It will be seen that there is no exertion needed to bring the rubber up; the straps H H having stretched while the rubber is moved downward, will of themselves raise the rubber again.

Having thus fully described my invention,

What I claim as new, and desire to secure by Letters Patent, is—

The combination, substantially as described, of the carriage or rubber J and India-rubber straps or springs H H with a wash-board.

In testimony that I claim the foregoing as my own, I affix my signature in presence of two witnesses.

JOHN MILLER.

Witnesses:
GEO. J. MARGERUM,
E. J. MARGERUM.